(12) United States Patent
Tsunaki et al.

(10) Patent No.: US 9,620,762 B2
(45) Date of Patent: Apr. 11, 2017

(54) ELECTRICAL STORAGE ELEMENT

(71) Applicant: Hitachi Automotive Systems, Ltd., Hitachinaka-shi, Ibaraki (JP)

(72) Inventors: Takuro Tsunaki, Hitachinaka (JP); Masaaki Iwasa, Hitachinaka (JP); Kazuaki Urano, Hitachinaka (JP); Sho Saimaru, Hitachinaka (JP); Sho Matsumoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/765,360

(22) PCT Filed: Feb. 1, 2013

(86) PCT No.: PCT/JP2013/052334
§ 371 (c)(1),
(2) Date: Aug. 3, 2015

(87) PCT Pub. No.: WO2014/118965
PCT Pub. Date: Aug. 7, 2014

(65) Prior Publication Data
US 2015/0380712 A1    Dec. 31, 2015

(51) Int. Cl.
*H01M 2/20*  (2006.01)
*H01M 2/08*  (2006.01)
(Continued)

(52) U.S. Cl.
CPC ............. *H01M 2/206* (2013.01); *H01M 2/06* (2013.01); *H01M 2/08* (2013.01); *H01M 2/263* (2013.01);
(Continued)

(58) Field of Classification Search
CPC ........ H01M 2/006; H01M 2/206; H01M 2/08; H01M 2/06; H01M 2/263; H01M 2/305; H01M 2220/20
See application file for complete search history.

(56) References Cited

U.S. PATENT DOCUMENTS

2007/0099074 A1    5/2007    Yoon et al.
2009/0211082 A1    8/2009    Yoon et al.
(Continued)

FOREIGN PATENT DOCUMENTS

CN          101297417 A      10/2008
DE    11 2012 003 618 T5       5/2014
(Continued)

OTHER PUBLICATIONS

International Search Report (PCT/ISA/210) dated Mar. 5, 2013, with English translation (Five (5) pages).
(Continued)

*Primary Examiner* — Jane Rhee
(74) *Attorney, Agent, or Firm* — Crowell & Moring LLP

(57) ABSTRACT

An electrical storage element includes a power generation element that includes an electrode, a can in which the power generation element is stored, a lid that seals an opening of the can, an external terminal that is disposed on the lid, and a current collector that connects the electrode of the power generation element, and the external terminal. The external terminal includes a bus bar welding portion having a bus bar welding surface to which a bus bar is welded, and a current collector connection portion having a caulking-jig abutting surface, the current collector connection portion includes an insertion portion which is inserted into a through-hole of the lid and has a tip end which is fixed to the current collector by caulking, the bus bar welding portion and the current collector connection portion are integrally provided in parallel on the lid, and the jig abutting surface is extended from (Continued)

the bus bar welding surface in the same plane as the bus bar welding surface.

4 Claims, 7 Drawing Sheets

(51) Int. Cl.
*H01M 2/06* (2006.01)
*H01M 2/26* (2006.01)
*H01M 2/30* (2006.01)

(52) U.S. Cl.
CPC ........ *H01M 2/305* (2013.01); *H01M 2220/20* (2013.01)

(56) References Cited

U.S. PATENT DOCUMENTS

2010/0081048 A1 4/2010 Nansaka et al.
2013/0260221 A1 10/2013 Yoshitake et al.
2014/0212740 A1 7/2014 Munenaga et al.

FOREIGN PATENT DOCUMENTS

| EP | 0 674 351 A2 | 9/1995 |
|---|---|---|
| EP | 2 388 849 A1 | 11/2011 |
| JP | 2010-80355 A | 4/2010 |
| JP | 2012-9319 A | 1/2012 |
| JP | 2012-123946 A | 6/2012 |
| JP | 2012-160337 A | 8/2012 |
| JP | 2012-243405 A | 12/2012 |
| JP | 2012-243406 A | 12/2012 |
| JP | 2012-248451 A | 12/2012 |
| WO | WO 2012/090744 A1 | 7/2012 |

OTHER PUBLICATIONS

Supplementary European Search Report issued in counterpart European Application No. 13873839.8 dated Sep. 7, 2016 (8 pages).

ELECTRICAL STORAGE ELEMENT

TECHNICAL FIELD

The present invention relates to an electrical storage element.

BACKGROUND ART

Recently, a large capacity (Wh) secondary battery has been developed as a power source of a hybrid electric vehicle, a pure electric vehicle, or the like. Among secondary batteries, a lithium-ion secondary battery which has high energy density (Wh/kg) and a rectangular shape has attracted attention.

In the rectangular lithium-ion secondary battery, a flat wound electrode group is formed as a power generation element. The flat wound electrode group is obtained by stacking a positive electrode, a negative electrode, and a separator and winding a result of stacking. The positive electrode is obtained by coating a positive electrode foil with a positive electrode active material. The negative electrode is obtained by coating a negative electrode foil with a negative electrode active material. The separator is used for insulating each of the positive electrode and the negative electrode. The wound electrode group is electrically connected to a positive external terminal and a negative external terminal which are provided on a battery lid of a battery case. The wound electrode group is stored in the battery can of the battery case and an opening of the battery can is welded and sealed to the battery lid. The rectangular secondary battery is formed in such a manner that an electrolyte is injected through a liquid injection hole of the battery case which stores the wound electrode group and then a liquid stopper is inserted, and sealing and welding are performed by laser welding.

Positive external terminals and negative external terminals of a plurality of rectangular secondary batteries are electrically connected by using a conductive member such as a bus bar, and thus a battery pack is formed. The bus bar is connected to the rectangular secondary battery by performing screw-fastening to the external terminals with a bolt and a nut, or by performing welding to the external terminals.

PTL 1 discloses a secondary battery in which the bus bar can be connected to an external terminal by performing welding. The secondary battery disclosed in PTL 1 includes a current collector (current collecting member in PTL 1) which is bonded to the power generation element, and a connection member (caulking member) which is disposed on the battery lid and is electrically connected to an external terminal. In the secondary battery disclosed in PTL 1, one end of the connection member and the external terminal are fixed by caulking, and another end of the connection member and the current collector are fixed by caulking.

CITATION LIST

Patent Literature

PTL 1: JP-A-2012-123946

SUMMARY OF INVENTION

Technical Problem

In the above-described secondary battery disclosed in PTL 1, members for electrically connecting the bus bar and the power generation element are configured by the external terminal, the connection member, and the current collector and the connection member is connected to each of the external terminal and the current collector. Thus, a manufacturing process may be complicated. In the secondary battery disclosed in PTL 1, connection portions are provided at two places in a conduction path between the external terminal and the current collector. Thus, contact resistance may become great.

The external terminal of the above-described secondary battery disclosed in PTL 1 has a caulking fixation portion to which the connection member is fixed by caulking, and a bus bar bonding portion to which the bus bar is bonded. The external terminal has a downward slope from the bus bar bonding portion toward the caulking fixation portion. The caulking fixation portion and the bus bar bonding portion are disposed in different levels. For this reason, it is difficult to perform caulking processing of the current collector and the connection member by causing a jig to abut on a caulking fixation portion which is a portion of the external terminal, and thus improvement of workability is required.

Solution to Problem

According to an aspect of the invention, there is provided an electrical storage element including a power generation element that includes an electrode, a can in which the power generation element is stored, a lid that seals an opening of the can, an external terminal that is disposed on the lid, and a current collector that connects the electrode of the power generation element, and the external terminal, in which the external terminal includes a bus bar welding portion having a bus bar welding surface to which a bus bar is welded, and a current collector connection portion having a caulking-jig abutting surface, the current collector connection portion includes an insertion portion which is inserted into a through-hole of the lid and has a tip end which is fixed to the current collector by caulking, the bus bar welding portion and the current collector connection portion are integrally provided in parallel on the lid, and the jig abutting surface is extended from the bus bar welding surface in the same plane as the bus bar welding surface.

Advantageous Effects of Invention

According to the present invention, the bus bar welding portion and the current collector connection portion are integrally provided. Thus, it is possible to reduce contact resistance, to reduce required man-hours for assembling of the rectangular secondary battery, and to improve a yield. In addition, a jig abutting surface is in the same plane as that of a bus bar welding surface and is extended from the bus bar welding surface. Thus, it is possible to improve workability of the caulking processing.

Hereinafter, an embodiment of an electrical storage element according to the present invention will be described with reference to the accompanying drawings.

Figure 1:
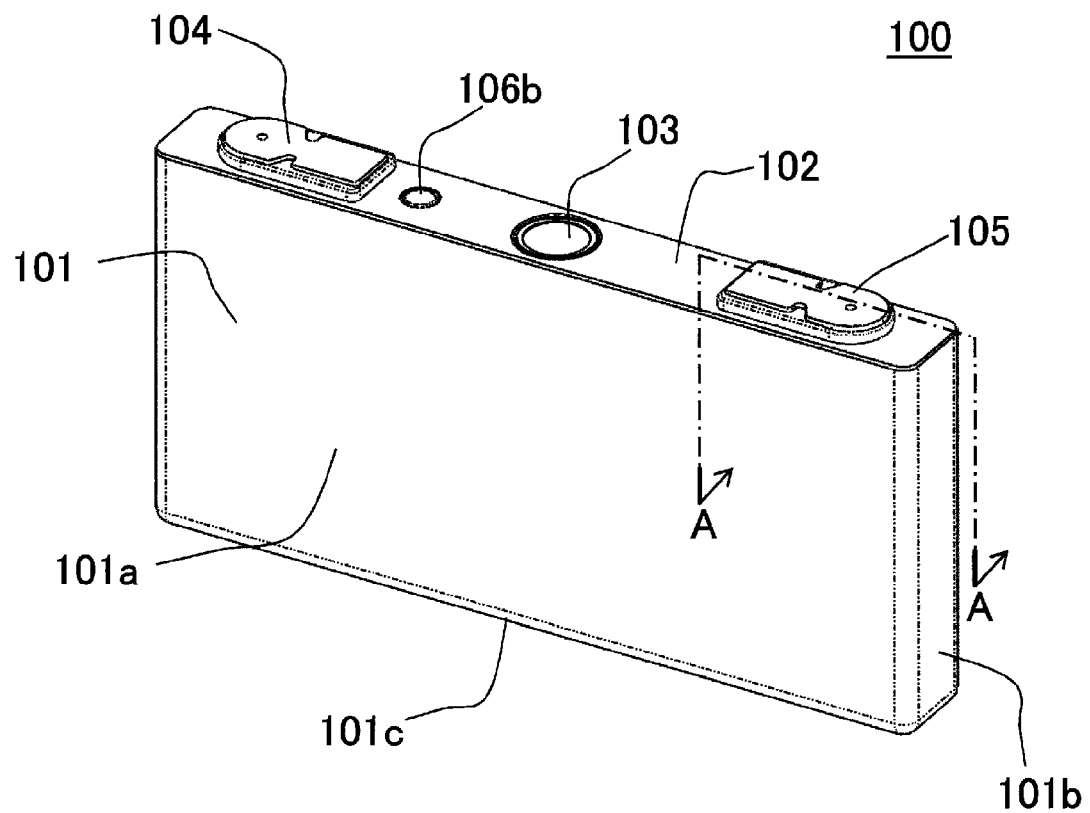
FIG. 1 is an appearance perspective view of a rectangular secondary battery as an embodiment of an electrical storage element according to the present invention.
Figure 2:
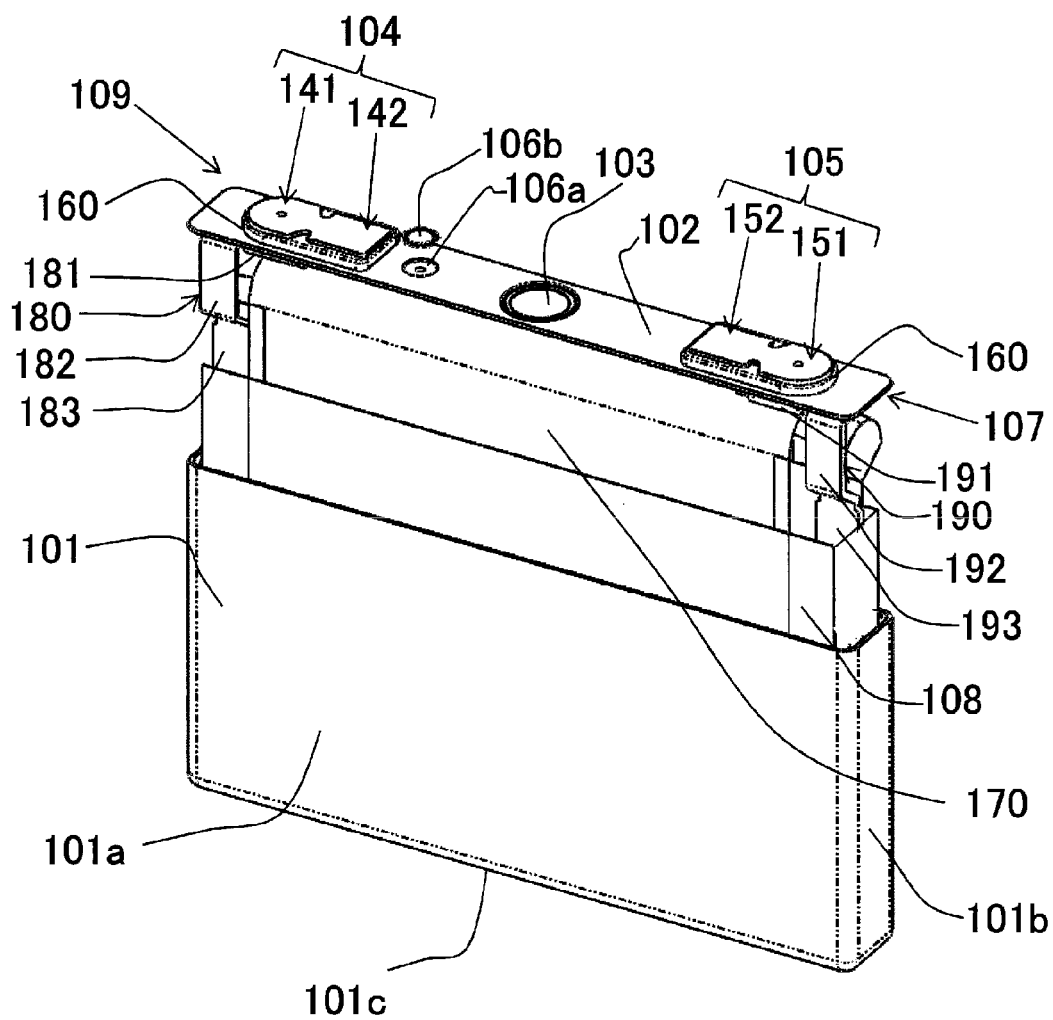
FIG. 2 is an exploded perspective view illustrating a configuration of the rectangular secondary battery.

FIG. 1 is an appearance perspective view of a rectangular secondary battery 100 as an embodiment of an electrical storage element according to the present invention. FIG. 2 is an exploded perspective view illustrating a configuration of the rectangular secondary battery 100.

As illustrated in FIG. 1, the rectangular secondary battery 100 includes a battery case which is formed from a battery can 101 and a battery lid 102. A material of the battery can 101 and the battery lid 102 is aluminum, aluminum alloys, or the like. The battery can 101 is formed to have a flat rectangular box shape of which one end is opened, by performing deep drawing processing. The battery can 101 has a base plate 101c having a rectangular plate shape, a pair of wide-width side plates 101a which respectively stand up from a pair of long side portions of the base plate 101c, and a pair of narrow-width side plates 101b which respectively stand up from a pair of short side portions of the base plate 101c.

As illustrated in FIG. 2, a wound electrode group 170 (see FIG. 3) is stored in the battery can 101. The wound electrode group 170 is held by a lid assembly 107 (see FIG. 4). A positive current collector 180, a negative current collector 190, and the wound electrode group 170 are stored in the battery can 101 in a state of being covered by an insulating case 108. The positive current collector 180 is bonded to a positive electrode 174 (see FIG. 3) of the wound electrode group 170, and the negative current collector 190 is bonded to a negative electrode 175 (see FIG. 3) of the wound electrode group 170. A material of the insulating case 108 is resin such as polypropylene, which has insulating properties. The battery can 101 and the wound electrode group 170 are electrically insulated.

As illustrated in FIGS. 1 and 2, the battery lid 102 has a rectangular plate shape and is subjected to laser welding so as to block an opening of the battery can 101. That is, the battery lid 102 seals the opening of the battery can 101. As illustrated in FIG. 1, a positive external terminal 104 and a negative external terminal 105 are disposed on the battery lid 102, and are electrically connected to the positive electrode 174 and the negative electrode 175 (see FIG. 3) of the wound electrode group 170.

As illustrated in FIG. 2, the positive external terminal 104 is electrically connected to the positive electrode 174 (see FIG. 3) of the wound electrode group 170 through the positive current collector 180. The negative external terminal 105 is electrically connected to the negative electrode 175 (see FIG. 3) of the wound electrode group 170 through the negative current collector 190. For this reason, power is supplied to an external device through the positive external terminal 104 and the negative external terminal 105, or charging is performed by supplying externally generated power to the wound electrode group 170 through the positive external terminal 104 and the negative external terminal 105.

As illustrated in FIG. 2, a liquid injection hole 106a for injecting an electrolyte into the battery case is bored into the battery lid 102. The liquid injection hole 106a is sealed by a liquid stopper 106b after the electrolyte is injected. As the electrolyte, for example, a nonaqueous electrolyte obtained by dissolving a lithium salt such as lithium hexafluorophosphate ($LiPF_6$) in a carbonic acid ester organic solvent such as ethylene carbonate may be used.

A gas exhaust valve 103 is provided in the battery lid 102. The gas exhaust valve 103 is formed by performing sheet metal thinning partially on the battery lid 102 through press processing. A thin film member is attached to an opening of the battery lid 102 by performing laser welding and the like, and thus a thin part may be used as the gas exhaust valve. The gas exhaust valve 103 is cleaved when heat is generated in the rectangular secondary battery 100 due to abnormality such as overcharging and thus a gas is generated, and pressure in the battery case increases and thus reaches a predetermined pressure. The gas is exhausted from the inside of the rectangular secondary battery 100 and thus the pressure in the battery case is reduced.

Figure 3:
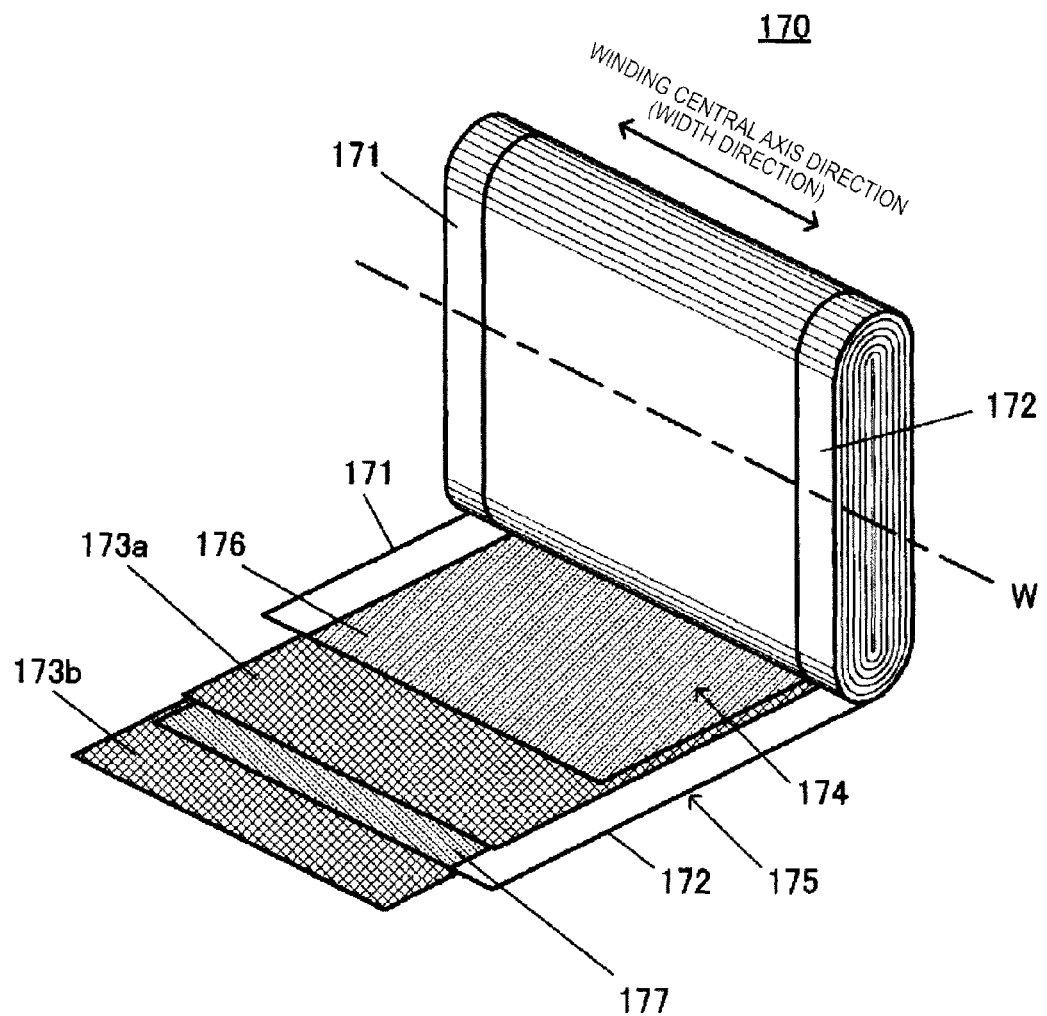
FIG. 3 is a perspective view illustrating a wound electrode group.

The wound electrode group 170 will be described with reference to FIG. 3. FIG. 3 is a perspective view illustrating the wound electrode group 170 and FIG. 3 illustrates a state where a winding end side of the wound electrode group 170 is unfolded. The wound electrode group 170 which is a power generation element has a layered structure which is obtained by interposing separators 173a and 173b between the long positive electrode 174 and the long negative electrode 175 and winding a result of interposing around a winding central axis W so as to be flat.

In the positive electrode 174, a layer 176 of a positive electrode active material mixture is formed on both surfaces of a positive electrode foil 171. The positive electrode active material mixture is obtained by mixing a binding material (binder) with a positive electrode active material. In the negative electrode 175, a layer 177 of a negative electrode active material mixture is formed on both surfaces of a negative electrode foil 172. The negative electrode active material mixture is obtained by mixing a binding material (binder) with a negative electrode active material.

The positive electrode foil 171 is aluminium foil having a thickness of about 20 μm to 30 μm. The negative electrode foil 172 is copper foil having a thickness of about 15 μm to 20 μm. A raw material of the separators 173a and 173b is fine-porous polyethylene resin which allows lithium ions to pass through the separators. The positive electrode active material is lithium transition metal compound oxide such as lithium manganite, and the negative electrode active material is a carbon material such as graphite which allows lithium ions to be reversibly stored or discharged.

Regarding both end portions of the wound electrode group 170 in a width direction, that is, in a direction of the winding central axis W which is orthogonal to a winding direction, one end portion is a layered portion of the positive electrode 174 and the other end portion is a layered portion of the negative electrode 175. The layered portion of the positive electrode 174 which is provided on the one end portion of the wound electrode group 170 is a positive-material-not-coated portion at which the positive electrode active material mixture layer 176 is not formed, that is, a portion at which an exposure portion of the positive electrode foil 171 is layered. The layered portion of the negative electrode 175 which is provided on the other end portion of the wound electrode group 170 is a negative-material-not-coated portion at which the negative electrode active material mixture layer 177 is not formed, that is, a portion at which an exposure portion of the negative electrode foil 172 is layered. The layered portion of the positive-material-not-coated portion and the layered portion of the negative-material-not-coated portion are crushed in advance. The crushed layered portion of the positive-material-not-coated portion is connected to the positive current collector 180 of a lid assembly 107 (see FIG. 4) which will be described later by performing ultrasonic bonding, and the crushed layered portion of the negative-material-not-coated portion is connected to the negative current collector 190 of the lid assembly 107 (see FIG. 4) which will be described later by performing ultrasonic bonding. Thus, an electrode group assembly 109 (see FIG. 2) is formed.

Figure 4:
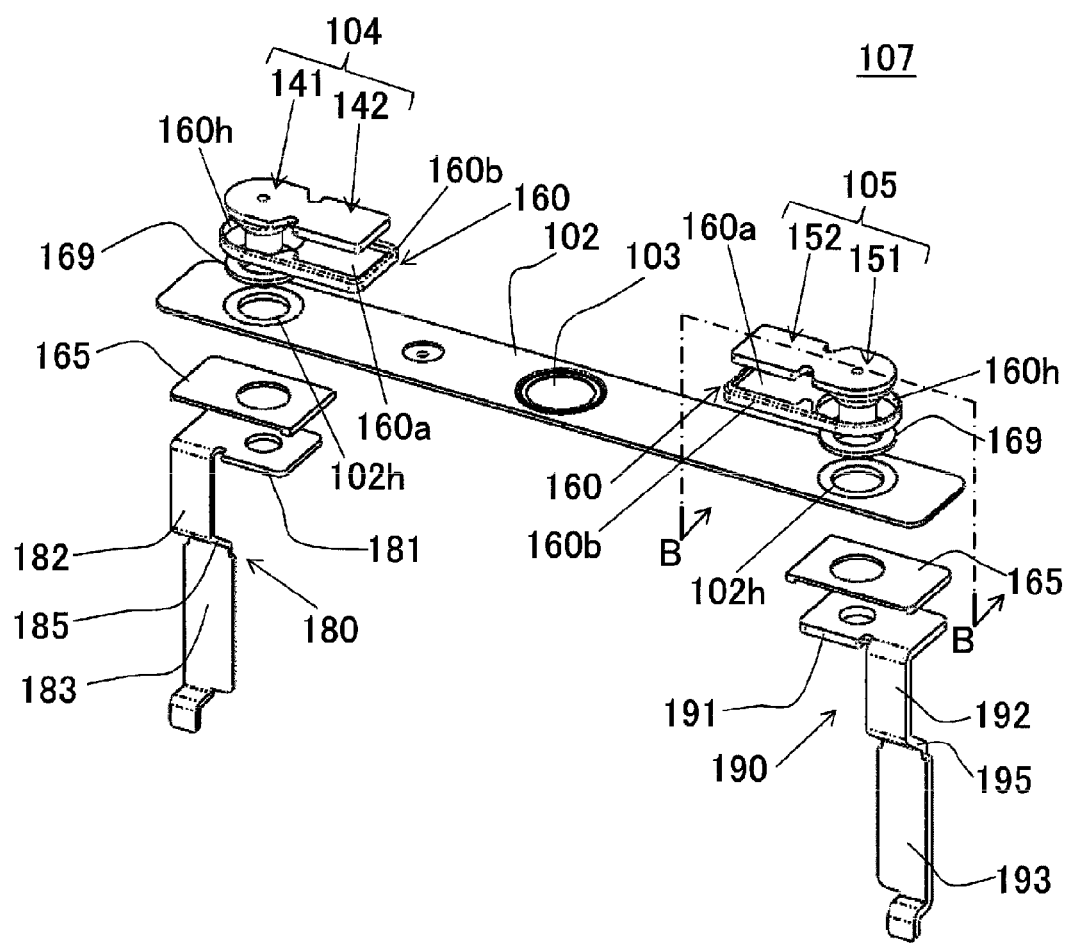
FIG. 4 is an exploded perspective view illustrating a lid assembly.
Figure 5A:
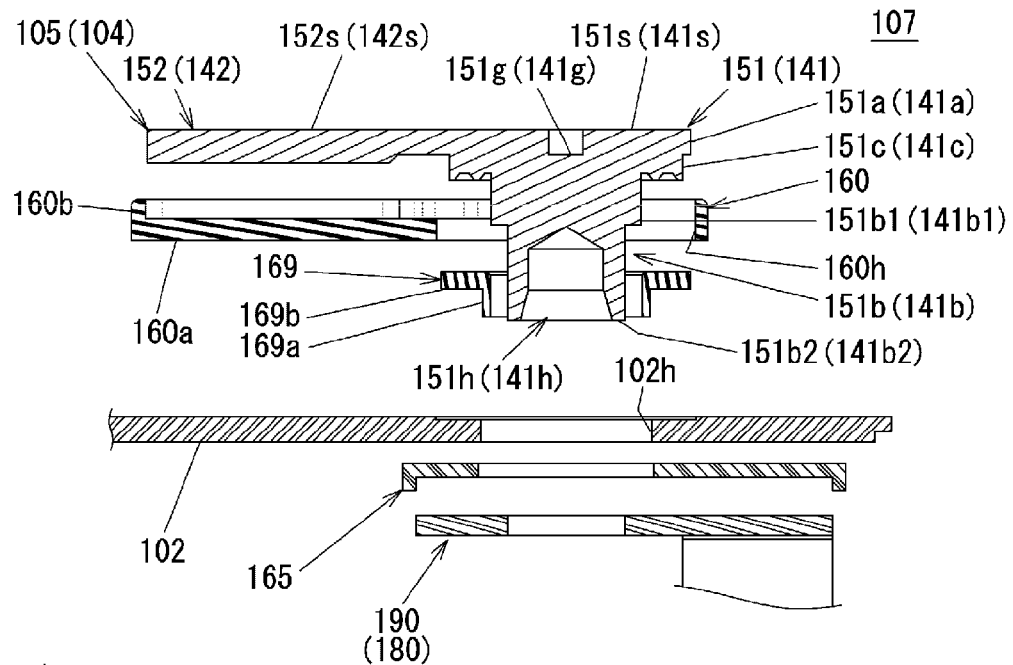
FIGS. 5A-5C are cross-sectional views illustrating a configuration of the lid assembly.
Figure 5B:
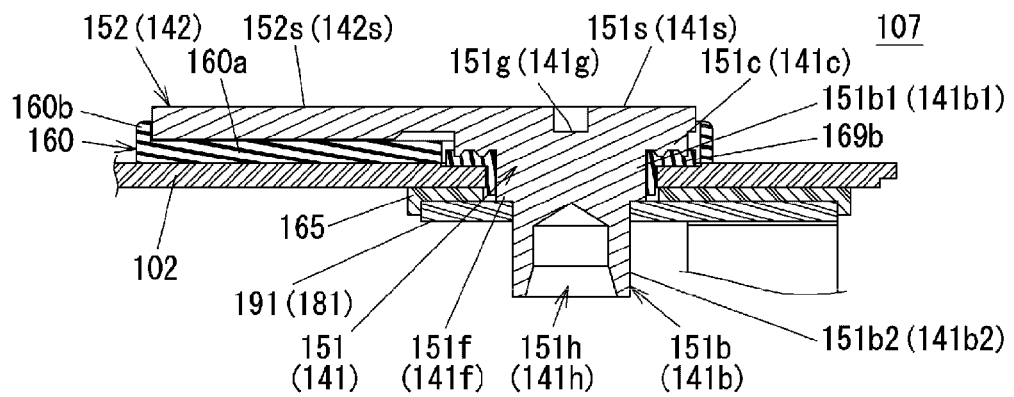
Figure 5C:
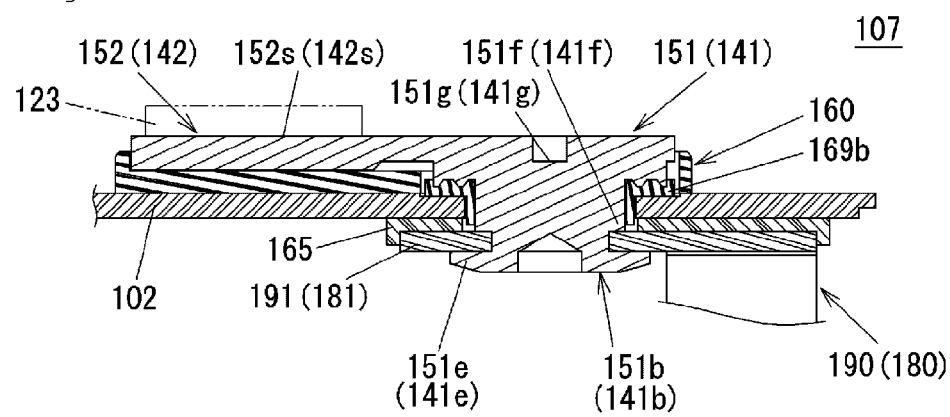

A configuration of the lid assembly 107 will be described in detail with reference to FIGS. 4 to 6. FIG. 4 is an exploded perspective view illustrating the lid assembly 107, and FIG. 5 is a cross-sectional view illustrating the configuration of the lid assembly 107. FIG. 5(a) is a cross-sectional view taken along line B-B in FIG. 4. FIG. 5(b) is a cross-sectional view illustrating a state where components of the lid assembly 107 are assembled. FIG. 5(b) illustrates a state before tip ends of the positive insertion portion 141b and the negative insertion portion 151b are caulked. FIG. 5(c) is a cross-sectional view taken along line A-A in FIG. 1. FIG. 5(c) illustrates a state after the tip ends of the positive insertion portion 141b and the negative insertion portion 151b are caulked. FIG. 5 illustrates a configuration of the negative electrode side. However, since the positive electrode side also has a similar shape and a similar configuration, reference signs of components of the positive electrode side are added by using parentheses, for convenience.

As illustrated in FIGS. 4 and 5(a), the lid assembly 107 includes a battery lid 102, a positive external terminal 104, a negative external terminal 105, a pair of external insulators 160, a pair of internal insulators 165, a pair of gaskets 169, the positive current collector 180, and the negative current collector 190. The positive external terminal 104 is provided at one end of the battery lid 102, and the negative external terminal 105 is provided at another end of the battery lid 102.

A material of the positive external terminal 104 and the positive current collector 180 is aluminium. The positive external terminal 104 is electrically connected to the positive current collector 180 by caulking the tip end of the positive insertion portion 141b on a bearing surface portion 181 of the positive current collector 180 (see FIG. 7), as will be described later. A material of the negative external terminal 105 and the negative current collector 190 is a copper alloy. The negative external terminal 105 is electrically connected to the negative current collector 190 by caulking the negative insertion portion 151b on a bearing surface portion 191 of the negative current collector 190 (see FIG. 7), as will be described later.

The positive external terminal 104 is attached to the battery lid 102 through the external insulator 160 and the gasket 169. Similarly, the negative external terminal 105 is attached to the battery lid 102 through the external insulator 160 and the gasket 169. The positive current collector 180 and the negative current collector 190 are attached to the battery lid 102 through the internal insulator 165. A material of the external insulator 160 and the internal insulator 165 is resin such as polypropylene (PP), which has insulating properties. A material of the gasket 169 is resin such as tetrafluoroethylene perfluoroalkyl vinyl ether copolymer (PFA), which has insulating properties.

The rectangular secondary battery 100 is connected with other rectangular secondary batteries (not illustrated) by using the bus bar, and thereby a battery pack is configured. In this embodiment, the bus bar 123 indicated by a two-dot chain line in FIG. 5(c) is connected to the external terminals 104 and 105 of the rectangular secondary battery 100 by performing laser welding.

Figure 6A:
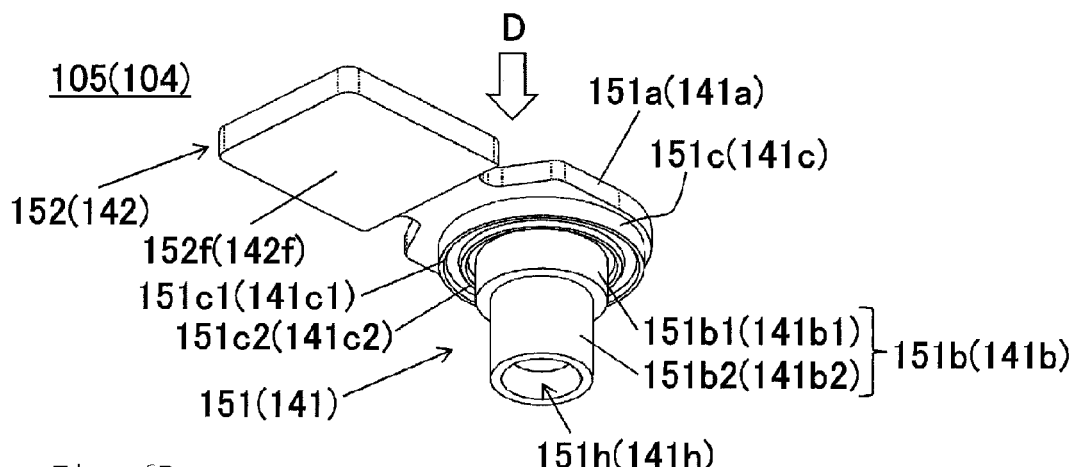
FIG. 6A is an appearance perspective view of an external terminal.
Figure 6B:
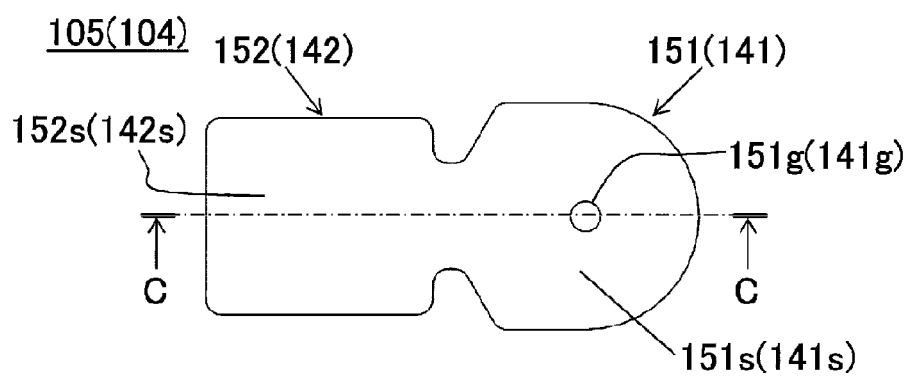
FIG. 6B is a plan view of the external terminal when viewed from a D direction of FIG. 6A.
Figure 6C:
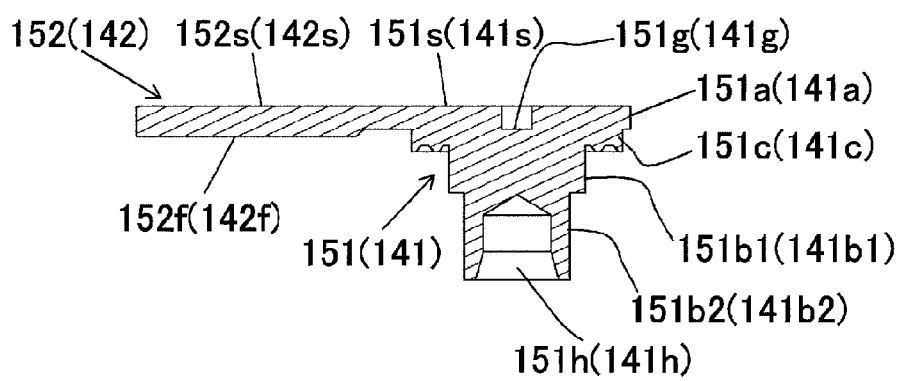
FIG. 6C is a cross-sectional view of the external terminal taken along line C-C of FIG. 6B.

FIG. 6 is a component diagram of each of the external terminals. FIG. 6(a) is an appearance perspective view of the external terminal. FIG. 6(b) is a plan view of the external terminal when viewed from a D direction in FIG. 6(a). FIG. 6(c) is a cross-sectional view of the external terminal taken along line C-C in FIG. 6(b).

As illustrated in FIGS. 4, 5(a), and 6 the positive external terminal 104 includes a bus bar welding portion 142 and a current collector connection portion 141. The bus bar 123 is electrically connected to the bus bar welding portion 142 by performing laser welding. The positive current collector 180 is electrically connected to the current collector connection portion 141 through the caulking processing. The bus bar welding portion 142 and the current collector connection portion 141 are integrally provided in parallel over the battery lid 102.

Similarly, the negative external terminal 105 includes a bus bar welding portion 152 and a current collector connection portion 151. The bus bar 123 is electrically connected to the bus bar welding portion 152 by performing laser welding. The negative current collector 190 is electrically connected to the current collector connection portion 151 through the caulking processing. The bus bar welding portion 152 and the current collector connection portion 151 are integrally provided in parallel over the battery lid 102. Each of the positive external terminal 104 and the negative external terminal 105 is molded by performing forging and the like.

The bus bar welding portion 142 of the positive external terminal 104 has a rectangular plate shape and is disposed on an external side of the battery case (see FIGS. 4 and 5). As illustrated in FIG. 6, one surface of the bus bar welding portion 142 becomes a lid-side abutment surface 142f which abuts on a terminal insulating portion 160a of the external insulator 160. An opposite surface of the lid-side abutment surface 142f becomes a welding surface 142s. The welding surface 142s is a planar surface which is parallel with the battery lid 102. The bus bar 123 and the positive external terminal 104 are subjected to laser welding (see FIG. 5(c)) in a state where the bus bar 123 abuts on the welding surface 142s.

Similarly, the bus bar welding portion 152 of the negative external terminal 105 has a rectangular plate shape and is disposed on the external side of the battery case (see FIGS. 4 and 5). As illustrated in FIG. 6, one surface of the bus bar welding portion 152 becomes a lid-side abutment surface 152f which abuts on the terminal insulating portion 160a of the external insulator 160. An opposite surface of the lid-side abutment surface 152f becomes a welding surface 152s. The welding surface 152s is a planar surface which is parallel with the battery lid 102. The bus bar 123 and the negative external terminal 105 are subjected to laser welding (see FIG. 5(c)) in a state where the bus bar 123 abuts on the welding surface 152s.

As illustrated in FIGS. 5(a) and 6, the current collector connection portion 141 of the positive external terminal 104 has a base portion 141a, a positive insertion portion 141b, and a seal portion 141c. The base portion 141a is extended from the bus bar welding portion 142 along the battery lid 102. The positive insertion portion 141b is provided so as to protrude toward the inside of the battery case from the base portion 141a. The seal portion 141c is provided on an outer circumference of the positive insertion portion 141b. The base portion 141a is formed such that the length of the base portion 141a in a direction orthogonal to the wide-width side plate 101a becomes shorter when approaching the bus bar welding portion 142.

As illustrated in FIGS. 6(b) and 6(c), a surface of the base portion 141a on an opposite side of the battery lid 102 side becomes a jig abutting surface 141s on which an upper part 20 (see FIG. 7) of a jig which is used in the caulking processing (which will be described later) is pushed. The jig abutting surface 141s is in the same plane as the welding surface 142s of the bus bar welding portion 142 and is continuously extended from the welding surface 142s.

Similarly, as illustrated in FIGS. 5(a) and 6, the current collector connection portion 151 of the negative external terminal 105 has a base portion 151a, a negative insertion portion 151b, and a seal portion 151c. The base portion 151a is extended from the bus bar welding portion 152 along the battery lid 102. The negative insertion portion 151b is provided so as to protrude toward the inside of the battery case from the base portion 151a. The seal portion 151c is provided on an outer circumference of the negative insertion portion 151b. The base portion 151a is formed such that the length of the base portion 151a in a direction orthogonal to the wide-width side plate 101a becomes shorter when approaching the bus bar welding portion 152.

As illustrated in FIGS. 6(b) and 6(c), a surface of the base portion 151a on an opposite side of the battery lid 102 side becomes a jig abutting surface 151s on which an upper part 20 (see FIG. 7) of a jig which is used in the caulking processing (which will be described later) is pushed. The jig abutting surface 151s is in the same plane as the welding surface 152s of the bus bar welding portion 152 and is continuously extended from the welding surface 152s.

As illustrated in FIGS. 5 and 6, the positive insertion portion 141b is provided so as to protrude toward the inside of the battery case from the base portion 141a and pass through a through-hole 102h of the battery lid 102. The positive insertion portion 141b has a base-end-side insertion portion 141b1 and a tip-end-side insertion portion 141b2. The base-end-side insertion portion 141b1 has a columnar shape which is provided so as to protrude toward the inside of the battery case from the base portion 141a. The tip-end-side insertion portion 141b2 has a cylindrical shape which is provided so as to protrude toward the inside of the battery case from the base-end-side insertion portion 141b1. The outer diameter of the tip-end-side insertion portion 141b2 is formed so as to be less than the outer diameter of the base-end-side insertion portion 141b1. An abutment step portion 141f is formed between the tip-end-side insertion portion 141b2 and the base-end-side insertion portion 141b1. The tip-end-side insertion portion 141b2 is a part (see FIG. 7) which is fixed to the bearing surface portion 181 of the positive current collector 180 by caulking, as will be described later.

Similarly, as illustrated in FIGS. 5 and 6, the negative insertion portion 151b is provided so as to protrude toward the inside of the battery case from the base portion 151a and pass through the through-hole 102h of the battery lid 102. The negative insertion portion 151b has a base-end-side insertion portion 151b1 and a tip-end-side insertion portion 151b2. The base-end-side insertion portion 151b1 has a columnar shape which is provided so as to protrude toward the inside of the battery case from the base portion 151a. The tip-end-side insertion portion 151b2 has a cylindrical shape which is provided so as to protrude toward the inside of the battery case from the base-end-side insertion portion 151b1. The outer diameter of the tip-end-side insertion portion 151b2 is formed so as to be less than the outer diameter of the base-end-side insertion portion 151b1. An abutment step portion 151f is formed between the tip-end-side insertion portion 151b2 and the base-end-side insertion portion 151b1. The tip-end-side insertion portion 151b2 is a part (see FIG. 7) which is fixed to the bearing surface portion 191 of the negative current collector 190 by caulking, as will be described later.

As illustrated in FIGS. 5(a) and 6, a circular concave portion (which will be described below as an inner concave portion 141h) is provided on the tip-end-side insertion portion 141b2. The circular concave portion is formed so as to be depressed toward a base end side from a tip end side. A circular concave portion (which will be described below as an outer concave portion 141g) is provided on the base portion 141a. The circular concave portion is formed so as to be depressed toward the inside of the battery case from the jig abutting surface 141s. A central axis of the outer concave portion 141g matches with a central axis of the inner concave portion 141h. The diameter of the outer concave portion 141g is less than the diameter of the inner concave portion 141h.

Similarly, a circular concave portion (which will be described below as an inner concave portion 151h) is provided on the tip-end-side insertion portion 151b2. The circular concave portion is formed so as to be depressed toward a base end side from a tip end side. A circular concave portion (which will be described below as an outer concave portion 151g) is provided on the base portion 151a. The circular concave portion is formed so as to be depressed toward the inside of the battery case from the jig abutting surface 151s. A central axis of the outer concave portion 151g matches with a central axis of the inner concave portion 151h. The diameter of the outer concave portion 151g is less than the diameter of the inner concave portion 151h.

As illustrated in FIGS. 5(a) and 6, the seal portion 141c of the positive external terminal 104 protrudes toward the inside of the battery case from the base portion 141a in the outer circumference of the base-end-side insertion portion 141b1. An annular end surface of the seal portion 141c is a surface which presses a flange portion 169b of the gasket 169 which will be described later. As illustrated in FIG. 6(a), a first annular protrusion 141c1 and a second annular protrusion 141c2 are provided on this annular end surface.

Similarly, as illustrated in FIGS. 5(a) and 6, the seal portion 151c of the negative external terminal 105 protrudes toward the inside of the battery case from the base portion 151a in the outer circumference of the base-end-side insertion portion 151b1. An annular end surface of the seal portion 151c is a surface which presses the flange portion 169b of the gasket 169 which will be described later. As illustrated in FIG. 6(a), a first annular protrusion 151c1 and a second annular protrusion 151c2 are provided on this annular end surface.

As illustrated in FIGS. 4 and 5(a), a pair of through-holes 102h is provided on the battery lid 102. The base-end-side insertion portion 141b1 of the positive insertion portion 141b and the base-end-side insertion portion 151b1 of the negative insertion portion 151b are inserted into the pair of through-holes 102h.

The external insulator 160 will be described with reference to FIGS. 4 and 5. Since the external insulator 160 on the positive electrode side has the same shape as that of the external insulator 160 on the negative electrode side, the external insulator 160 on the negative electrode side will be described representatively. The external insulator 160 includes a terminal insulating portion 160a, a covering wall 160b, and a through-hole 160h into which the gasket 169 is inserted.

The terminal insulating portion 160a is interposed between the bus bar welding portion 152 of the negative external terminal 105 and the battery lid 102 and thus insulates the negative external terminal 105 and the battery lid 102. The covering wall 160b constitutes an outer edge of the external insulator 160. The covering wall 160b covers the bus bar welding portion 152 which is exposed to the outside of the battery case, and a portion of a side surface of the base portion 151a in the negative external terminal 105.

Similarly, in a case of the positive electrode side, the external insulator 160 having insulating properties is also disposed between the battery lid 102 and the positive external terminal 104, and thus the insulating properties between the positive external terminal 104 and the battery lid 102 are ensured.

The gasket 169 will be described with reference to FIG. 5. Since the gasket 169 on the positive electrode side has the same shape as that of the gasket 169 on the negative electrode side, the gasket 169 on the negative electrode side will be described representatively. The gasket 169 includes a tubular portion 169a which has a cylindrical shape, and the flange portion 169b which is provided on one end of the tubular portion 169a. The gasket 169 is mounted on the base-end-side insertion portion 151b1 of the negative insertion portion 151b.

The tubular portion 169a of the gasket 169 is disposed so as to be interposed between the through-hole 102h of the battery lid 102 and the base-end-side insertion portion 151b1 of the negative insertion portion 151b. The flange portion 169b of the gasket 169 is disposed so as to be pressed toward the battery lid 102 by the seal portion 151c and interposed between an outer face of the battery lid 102 and the annular end surface of the seal portion 151c in a state where a predetermined amount of compression is performed. Sealing is performed between the negative external terminal 105 and the battery lid 102 by disposing the gasket 169 in this manner. Since the gasket 169 has the above-described insulating properties, the negative external terminal 105 and the battery lid 102 are electrically insulated. Similarly, in a case of the positive electrode side, the gasket 169 having the insulating properties is disposed, and thereby sealing is performed between the positive external terminal 104 and the battery lid 102.

Since the first annular protrusions 141c1 and 151c1, and the second annular protrusions 141c2 and 151c2 which are illustrated in FIG. 6(a) compress the whole circumference of the flange portion 169b of the gasket 169, it is possible to ensure airtightness in the battery case.

The positive current collector 180 and the negative current collector 190 will be described with reference to FIG. 4. The positive current collector 180 electrically connects the positive electrode 174 of the wound electrode group 170 and the positive external terminal 104, and the negative current collector 190 electrically connects the negative electrode 175 of the wound electrode group 170 and the negative external terminal 105.

As illustrated in FIG. 4, the positive current collector 180 includes the bearing surface portion 181, a plate 182, and a flat bonding portion 183. The bearing surface portion 181 is formed along an inner surface of the battery lid 102. The plate 182 is bent from a side portion of the bearing surface portion 181 at a substantially right angle, and is extended toward the base plate 101c of the battery can 101 along the wide-width side plate 101a of the battery can 101. The flat bonding portion 183 is connected by a slant portion 185 which is provided on a lower end of the plate 182. A through-hole into which the tip-end-side insertion portion 141b2 of the positive insertion portion 141b is inserted is provided in the bearing surface portion 181.

Similarly, the negative current collector 190 includes the bearing surface portion 191, a plate 192, and a flat bonding portion 193. The bearing surface portion 191 is formed along an inner surface of the battery lid 102. The plate 192 is bent from a side portion of the bearing surface portion 191 at a substantially right angle, and is extended toward the base plate 101c of the battery can 101 along the wide-width side plate 101a of the battery can 101. The flat bonding portion 193 is connected by a slant portion 195 which is provided on a lower end of the plate 192. A through-hole into which the tip-end-side insertion portion 151b2 of the negative insertion portion 151b is inserted is provided in the bearing surface portion 191.

The internal insulator 165 having a rectangular plate shape is disposed between the bearing surface portion 181 of the positive current collector 180 and the battery lid 102, and between the bearing surface portion 191 of the negative current collector 190 and the battery lid 102. For this reason, the positive current collector 180 and the battery lid 102 are insulated by the internal insulator 165, and the negative current collector 190 and the battery lid 102 are insulated by the internal insulator 165. The internal insulator 165 on the positive electrode side has the same shape as that of the internal insulator 165 on the negative electrode side. A through-hole through which the base-end-side insertion portion 141b1 of the positive insertion portion 141b passes is provided on the internal insulator 165 on the positive electrode side. A through-hole through which the base-end-side insertion portion 151b1 of the negative insertion portion 151b passes is provided on the internal insulator 165 on the negative electrode side.

As illustrated in FIG. 5(b), the positive insertion portion 141b is inserted into the through-hole 102h of the battery lid 102 and the through-hole of the internal insulator 165, in a state where the gasket 169 is mounted on the base-end-side insertion portion 141b1. The tip-end-side insertion portion 141b2 of the positive insertion portion 141b is inserted into a through-hole which is formed on the bearing surface portion 181 of the positive current collector 180. As illustrated in FIG. 5(b), the outer diameter of the base-end-side insertion portion 141b1 is greater than the diameter of the through-hole of the bearing surface portion 181. The abutment step portion 141f which is formed between the base-end-side insertion portion 141b1 and the tip-end-side insertion portion 141b2 abuts on the bearing surface portion 181. That is, the base-end-side insertion portion 141b1 is not inserted into the through-hole of the bearing surface portion 181. If the tip end of the tip-end-side insertion portion 141b2 is caulked to the bearing surface portion 181, a positive-electrode caulking portion 141e is formed as illustrated in FIG. 5(c).

As a result, the bearing surface portion 181 is pinched by the positive-electrode caulking portion 141e and the abutment step portion 141f, and thus the positive current collector 180 and the positive external terminal 104 are electrically connected to each other. The flange portion 169b of the gasket 169 is pinched by the seal portion 141c and the outer face of the battery lid 102 and is held to be in a state where a predetermined amount of compression is performed. The positive-electrode caulking portion 141e and the bearing surface portion 181 of the positive current collector 180 may be fixed to each other by caulking, and then be subjected to laser welding.

Similarly, as illustrated in FIG. 5(*b*), the negative insertion portion 151*b* is inserted into the through-hole 102*h* of the battery lid 102 and the through-hole of the internal insulator 165, in a state where the gasket 169 is mounted on the base-end-side insertion portion 151*b*1. The tip-end-side insertion portion 151*b*2 of the negative insertion portion 151*b* is inserted into a through-hole which is formed on the bearing surface portion 191 of the negative current collector 190. As illustrated in FIG. 5(*b*), the outer diameter of the base-end-side insertion portion 151*b*1 is greater than the diameter of the through-hole of the bearing surface portion 191. The abutment step portion 151*f* which is formed between the base-end-side insertion portion 151*b*1 and the tip-end-side insertion portion 151*b*2 abuts on the bearing surface portion 191. That is, the base-end-side insertion portion 151*b*1 is not inserted into the through-hole of the bearing surface portion 191. If the tip end of the tip-end-side insertion portion 151*b*2 is caulked to the bearing surface portion 191, a negative-electrode caulking portion 151*e* is formed as illustrated in FIG. 5(*c*).

As a result, the bearing surface portion 191 is pinched by the negative-electrode caulking portion 151*e* and the abutment step portion 151*f*, and thus the negative current collector 190 and the negative external terminal 105 are electrically connected to each other. The flange portion 169*b* of the gasket 169 is pinched by the seal portion 151*c* and the outer face of the battery lid 102 and is held to be in a state where a predetermined amount of compression is performed. The negative-electrode caulking portion 151*e* and the bearing surface portion 191 of the negative current collector 190 may be fixed to each other by caulking, and then be subjected to laser welding.

A caulking process will be described with reference to FIG. 7. Since the caulking process of the positive insertion portion 141*b* for the bearing surface portion 181 of the positive current collector 180 is the same as the caulking process of the negative insertion portion 151*b* for the bearing surface portion 191 of the negative current collector 190, the caulking process on the negative electrode side will be described representatively. For the convenience of description, an up and down direction as illustrated in FIG. 7 is defined.

Figure 7A:
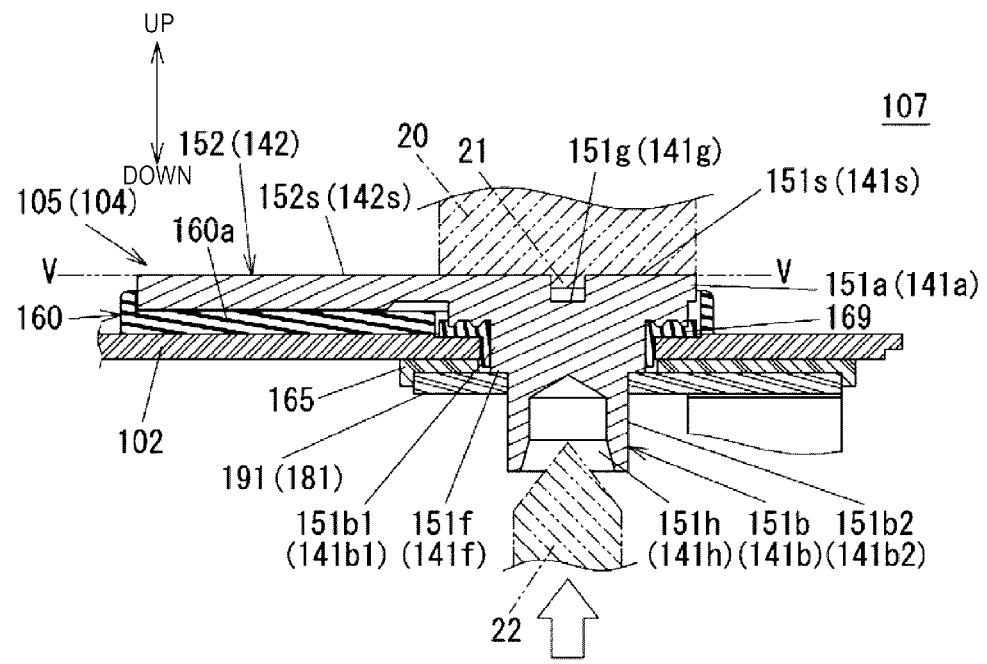
FIGS. 7A and 7B are views illustrating a process of caulking a tip end of a current collector connection portion of the external terminal to the current collector.
Figure 7B:
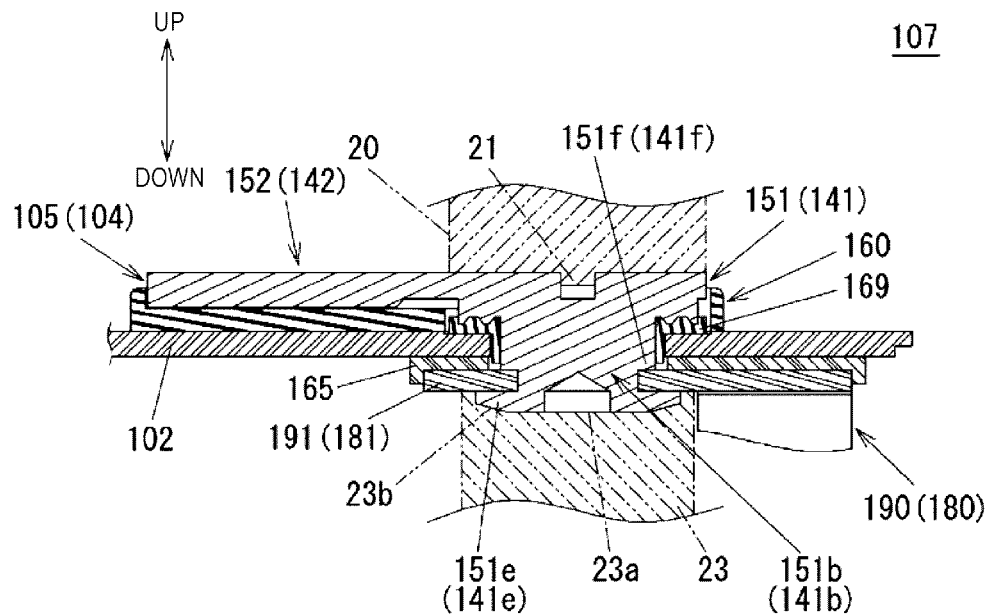

As illustrated in FIG. 7(*a*), an upper part 20 of a caulking jig is disposed over the lid assembly 107 and a lower part 22 of the caulking jig is disposed under the lid assembly 107. The upper part 20 of the caulking jig includes a planar flat portion and a convex portion 21. The flat portion abuts on the jig abutting surface 151*s* of the current collector connection portion 151. The convex portion 21 has a columnar shape and is provided so as to protrude downwardly from the flat portion. The lower part 22 of the caulking jig has a conic tip end.

The flat portion of the upper part 20 is caused to abut on the jig abutting surface 151*s* of the base portion 151*a*. Here, since a contact area of the upper part 20 is large, the upper part 20 may be brought into contact with the welding surface 152*s* in addition to the jig abutting surface 151*s*.

The convex portion 21 of the upper part 20 of the caulking jig is fit into the outer concave portion 151*g*, and thus it is possible to perform positioning of the negative external terminal 105 against the caulking jig with ease and high accuracy. A protrusion to a side on which the upper part 20 of the caulking jig is disposed is not formed on the jig abutting surface 151*s* and the welding surface 152*s* of the negative external terminal 105. In other words, as illustrated in FIG. 7(*a*), a protrusion to an upper side (that is, an opposite side of the battery lid 102 side) from a virtual plane V which includes the welding surface 152*s* and the jig abutting surface 151*s* is not provided on the negative external terminal 105. For this reason, good workability for positioning the upper part 20 of the caulking jig is obtained.

The lower part 22 is pressed and inserted into the inner concave portion 151*h* of the negative insertion portion 151*b* in a state where the upper part 20 is caused to abut on the jig abutting surface 151*s*. Accordingly, a tip end of the cylindrical tip-end-side insertion portion 151*b*2 is pushed and widened outwardly. The negative current collector 190, the negative external terminal 105, the gasket 169, the external insulator 160, and the internal insulator 165 are temporarily fixed to the battery lid 102 by the tip end of the tip-end-side insertion portion 151*b*2 having an enlarged diameter.

The type of the conic lower part 22 is sequentially exchanged so as to have a large tip-end angle. The exchanged type of the conic lower part 22 is pressed and inserted into the inner concave portion 151*h* of the negative insertion portion 151*b*. The tip end of the negative insertion portion 151*b* is gradually pushed and widened outwardly and thereby an enlarged diameter is obtained. In each of the processes, since the convex portion 21 of the upper part 20 is fit into the outer concave portion 151*g*, it is possible to press and insert the lower part 22 into the inner concave portion 151*h* of the negative insertion portion 151*b* with high accuracy.

As illustrated in FIG. 7(*b*), the lower part 23 which has a flat portion 23*a* and a slanted portion 23*b* is prepared. The flat portion 23*a* has a circular shape in a planar view which is parallel with the battery lid 102. The slanted portion 23*b* has an annular shape in a planar view, and is inclined toward the battery lid 102 from the flat portion 23*a*. The negative-electrode caulking portion 151*e* which has an annular shape in a planar view is formed by pressing and attaching the lower part 23 to the tip end of the negative insertion portion 151*b*. In this manner, the negative insertion portion 151*b* is caulked to the bearing surface portion 191 of the negative current collector 190, and thus the negative current collector 190, the negative external terminal 105, the gasket 169, the external insulator 160, and the internal insulator 165 are fixed to the battery lid 102 by caulking, and are thereby integrally formed. Similarly, in a case of the positive insertion portion 141*b*, caulking to the bearing surface portion 181 of the positive current collector 180 is performed, and thus the positive current collector 180, the positive external terminal 104, the gasket 169, the external insulator 160, and the internal insulator 165 are fixed to the battery lid 102 by caulking, and are thereby integrally formed.

According to the above-described embodiment, the following advantageous effects are obtained.

(1) The bus bar welding portion 142 and the current collector connection portion 141 are integrally provided in parallel over the battery lid 102, and the bus bar welding portion 152 and the current collector connection portion 151 are integrally provided in parallel over the battery lid 102. For this reason, it is possible to reduce contact resistance, to reduce required man-hours for assembling of the rectangular secondary battery 100, and to improve a yield.

In the secondary battery disclosed in PTL 1, the external terminal is connected to the current collector through the connection member (caulking member). For this reason, the number of components is large and connection locations on the conduction path are large in the secondary battery disclosed in PTL 1. On the contrary, in this embodiment, the external terminals 104 are directly connected to the current collector 180 and the external terminals 105 are directly connected to the current collector 190. Thus, the number of components is small and a simple configuration is made in comparison to the secondary battery disclosed in PTL 1. Accordingly, it is possible to reduce required man-hours for assembling due to smaller connection locations. In this embodiment, the contact resistance smaller than that in the secondary battery disclosed in PTL 1 is obtained.

(2) The jig abutting surface 141s of the positive external terminal 104 is extended from the welding surface 142s in the same plane as the welding surface 142s. The jig abutting surface 151s of the negative external terminal 105 is extended from the welding surface 152s in the same plane as the welding surface 152s. For this reason, it is possible to obtain good workability in the caulking processing and to improve the yield of the rectangular secondary battery 100.

Since an area of the caulking fixation portion which can be brought into contact with the caulking jig is small in a structure in which the bus bar bonding portion and the caulking fixation portion are provided in different levels, as in the external terminal disclosed in PTL 1, it is difficult to perform the caulking processing with high accuracy in this structure. In addition, it is considered that the bus bar bonding portion of the external terminal functions as an obstacle to positioning of the caulking jig and thus a period of time for performing positioning is spent.

On the contrary, in this embodiment, since there is no object which functions as an obstacle in positioning, it is possible to improve workability. The caulking processing may be performed by using the welding surfaces 142s and 152s in addition to the jig abutting surfaces 141s and 151s, and it is possible to widen a contact area of the caulking jig. Thus it is possible to perform the caulking processing with high accuracy.

Modifications as follows may be in a scope of the present invention. One of the modification examples or several modification examples may be combined with the above-described embodiment.

(1) In the above-described embodiment, a surface (outer face on an upper side illustrated in FIG. 7) on a side of each of the external terminals 104 and 105, on which the upper part 20 of the caulking jig abuts is a planar surface which is parallel with the battery lid 102 except for the outer concave portions 141g and the 151g. However, the present invention is not limited thereto. A depression or a hole may be provided in addition to the outer concave portions 141g and 151g and the jig abutting surfaces 141s and 151s may be provided so as to be respectively extended from the welding surfaces 142s and 152s through a groove. Each of the external terminals 104 and 105 may have various shapes as long as a protrusion to a side on which the upper part 20 of the caulking jig is disposed is not formed.

(2) In the above-described embodiment, an example in which protrusion portions which protrude upwardly from the virtual plane V illustrated in FIG. 7(*a*) are not respectively provided on the external terminals 104 and 105 is described. However, the present invention is not limited thereto. For example, protrusion portions which protrude upwardly from the virtual plane V may be respectively provided at end portions of the external terminals 104 and 105 on the center side of the battery case. The protrusion portion which protrudes upwardly from the virtual plane V is not provided at least between each of the welding surfaces 142s and 152s and each of the jig abutting surfaces 141s and 151s, and between each of the welding surfaces 142s and 152s and each of the jig abutting surfaces 141s and 151s. Thus, it is possible to improve workability in positioning of the caulking jig. In addition, the flat portion of the upper part 20 of the caulking jig abuts on a portion of the welding surfaces 142s and 152s in addition to the jig abutting surfaces 141s and 151s, and thus it is possible to perform the caulking processing with high accuracy.

(3) The material of the positive external terminal 104, the positive current collector 180, and the positive electrode foil 171 is not limited to aluminium, and may be an aluminium alloy. The material of the negative external terminal 105 and the negative current collector 190 is not limited to a copper alloy, and may be copper. The material of the negative electrode foil 172 is not limited to copper, and may be a copper alloy.

(4) In the above-described embodiment, both of the positive external terminal 104 and the negative external terminal 105 have similar shapes. However, the present invention is not limited thereto. Only one of the positive external terminal 104 and the negative external terminal 105 may employ the shape in the above-described embodiment.

(5) An example of using the lithium-ion secondary battery as the electrical storage element is described. However, the present invention is not limited thereto. The present invention may be applied to various types of electrical storage elements, for example, other secondary batteries such as a nickel hydrogen battery, a lithium-ion capacitor, an electrolytic double-layer capacitor, and the like.

In the above descriptions, various embodiments and modification examples are described. However, the present invention is not limited to details of these embodiments and examples. Other embodiments considered in a scope of technical ideas of the present invention may be included in the range of the prevent invention.

The invention claimed is:

1. An electrical storage element comprising:
a power generation element that includes an electrode;
a can in which the power generation element is stored;
a lid that seals an opening of the can;
an external terminal that is disposed on the lid; and
a current collector that connects the electrode of the power generation element, and the external terminal,
wherein the external terminal includes a bus bar welding portion having a bus bar welding surface to which a bus bar is welded, and a current collector connection portion having a caulking-jig abutting surface,
the current collector connection portion includes an insertion portion which is inserted into a through-hole of the lid and has a tip end which is fixed to the current collector by caulking,
the bus bar welding portion and the current collector connection portion are integrally formed as a single piece and provided in parallel on the lid, and
the caulking-jig abutting surface extends from and is in a same plane as the bus bar welding surface.

2. The electrical storage element according to claim 1, wherein
an object which protrudes toward an opposite side of the lid side from a virtual plane which includes the bus bar welding surface and the caulking-jig abutting surface, is not provided on the external terminal.

3. The electrical storage element according to claim 1, wherein
the insertion portion has a tip-end-side insertion portion that is inserted into the through-hole of the current collector, and a base-end-side insertion portion which is not inserted into the through-hole of the current collector, an abutment step portion which abuts on the current collector is provided between the base-end-side insertion portion and the tip-end-side insertion portion, and a tip end of the tip-end-side insertion portion is fixed to the current collector by caulking such that the current collector is pinched between the tip end of the tip-end-side insertion portion and the abutment step portion.

4. The electrical storage element according to claim 1, wherein a seal member that performs sealing between the lid and the external terminal is provided between the external terminal and the lid, and a seal portion that presses the seal member is provided on an outer circumference of the insertion portion.

* * * * *